Figure 1:
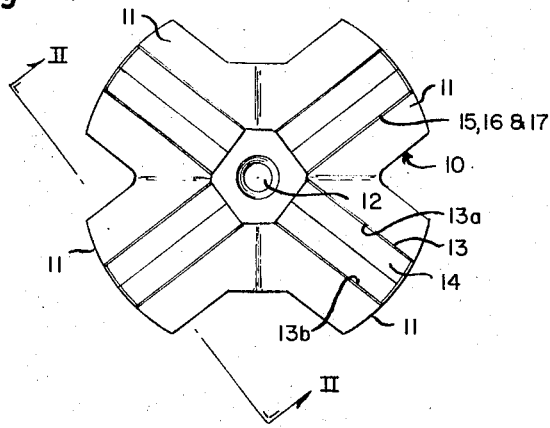

Dec. 27, 1966  E. F. BUELL  3,294,186
ROCK BITS AND METHODS OF MAKING THE SAME
Filed June 22, 1964

INVENTOR
Eugene F. Buell

United States Patent Office 3,294,186
Patented Dec. 27, 1966

3,294,186
ROCK BITS AND METHODS OF MAKING THE SAME
Eugene F. Buell, Richland Township, Allegheny County, Pa., assignor to Tartan Industries, Inc., Duncansville, Pa., a corporation of Pennsylvania
Filed June 22, 1964, Ser. No. 377,010
6 Claims. (Cl. 175—410)

This invention relates to rock bits and methods of making the same and particularly to carbide inserted rock bits and methods of effectively fastening said carbide inserts. Carbide insert rock bits are not new. Many methods and forms of rock bits having carbide inserts have been proposed with more or less satisfactory results. One of the principal problems in the rock bit industry lies in the high incidence of braze failures in rock bits. This failure occurs between the carbide and the steel drill body and appears to be in part the result of a failure of the braze metal to thoroughly wet both the steel and the carbide, in part entrapment of and failure of the flux within the braze metal and finally an excessive differential between the coefficients of expansion of the steel and carbide. As a result of these braze failures, it is not uncommon to have 10% and even 25% or more braze failures in any given lot of carbide inserted rock bits.

I have discovered a method and a rock bit structure which substantially completely eliminates these failures and provides complete continuity of the braze joint between the carbide insert and steel body.

In a preferred form of my invention, I provide an elongated generally cylindrical steel body having at one end an internal threaded opening adapted to receive a drill stem and at the other end a plurality of radially extending wings, a slot in each such wing extending from a point adjacent the axis of the body to the end of the wing, a cemented carbide tip in each such slot extends over the length thereof and spaced from the sides of the slot, a nickel or copper shim in said slot between each side and the carbide insert and a braze alloy layer on each side of said nickel or copper shim, said braze alloy layer having been fused under protective flux to the nickel or copper shim, the side wall of the slot and the carbide insert. Preferably the nickel or copper shim is precoated with said brazing alloy to a thickness substantially equal to one half the difference between the width of the carbide insert and the width of the slot receiving the insert and forced between the insert and the side wall of the slot. Preferably the coated shim is coated with a fusible flux prior to insertion and the assembly heated as by induction to fuse the entire assembly.

Figure 2:
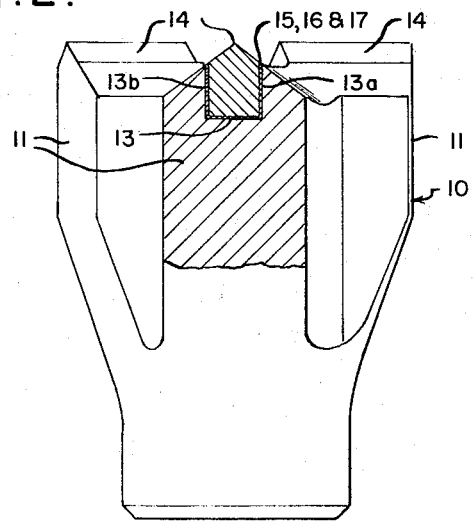
Figure 3:
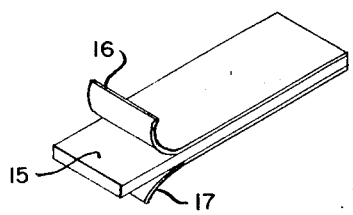

In the foregoing general description I have set out certain objects, purposes and advantages of my invention. Other objects, purposes and advantages will be apparent from a consideration of the following description and the accompanying drawings in which:

FIGURE 1 is a top plan view of a rock bit incorporating my invention;
FIGURE 2 is a side elevational view taken on the line II—II of FIGURE 1 partly in section; and
FIGURE 3 is an isometric view of a nickel shim for use in the practice of my invention.

Referring to the drawings, I have illustrated a rock bit body 10 having four radial wings 11 surrounding a conventional air discharge opening 12. Each wing 11 is provided with a slot 13 extending lengthwise centrally of the wing from a point adjacent opening 12 to the outer end of the wing. A preformed cemented carbide insert 14 such as tungsten carbide in a cobalt matrix is placed in slot 13 spaced from the edges 13a and 13b of said slot a distance sufficient to receive on each side a nickel shim 15 and braze alloy layers 16 and 17 on each side of the nickel shim. In a preferred embodiment, this distance is sufficient to receive a nickel shim 0.009 inch in thickness with 0.003 inch of braze metal on each side, for a total of 0.015 inch, in a tight force fit. These shims are forced between the carbide insert 14 and each of the sidewalls 13a and 13b of the slot and the assembly is heated in the presence of a suitable flux as in an induction furnace to fuse the braze metal on each side of the nickel shim between the carbide insert and the sidewalls of the slot. Preferably a shim is inserted which extends out of the slot to provide excess braze metal to flow into the area around the nickel. The excess nickel is removed by grinding after the brazing has been completed.

The nickel shim coated with braze metal may be prepared by dipping nickel shim stock into molten braze metal, or it may be prepared by rolling together nickel shim stock of appropriate thickness with thin sheet braze metal. This may be done by applying a coating of fusible flux such as borax to both sides of the nickel and heating the nickel stock and braze stock to fuse the flux, pressing the nickel and braze metal together and cooling to form a bond of solidified flux therebetween or alternatively an actual metal to metal bond may be formed by rolling the metal stocks at appropriate temperatures. As an alternative practice the nickel shim 15 and the two braze alloy layers 16 and 17 may be inserted as separate shims and fused in the finally assembled bit. If the braze alloys are inserted as separate shims they may project out of the slot to provide the excess braze metal necessary to fill the voids between the nickel shim, the carbide insert and the slot sidewall.

I have found that a particularly satisfactory braze alloy composition might have the following nominal composition:

| | Percent |
|---|---|
| Silver | 54 |
| Copper | 17 |
| Zinc | 15 |
| Cadmium | 9 |
| Nickel | 5 |

The foregoing braze composition is not essential to the operation of my process, and any of the well known compositions presently used as braze alloys in rock bit manufacture may be used. For example Handy and Harmon "Easy Flo 45" which has a nominal composition of:

| | Percent |
|---|---|
| Silver | 45 |
| Copper | 15 |
| Zinc | 16 |
| Cadmium | 24 | and Handy and Harmon SS-5 having a nominal composition of:

| | Percent |
|---|---|
| Silver | 40 |
| Copper | 30 |
| Zinc | 25 |
| Nickel | 5 | both of which are commonly used as rock bit braze alloys, will perform quite satisfactorily in my process.

While I have described a nickel shim in the specific embodiment of the drawings, I have found that a copper shim will perform similarly. By "nickel" and "copper" I mean not only the substantially pure metals, but those alloys in which they form the matrix and the major ingredient.

In the foregoing specification I have set out certain preferred practices and embodiments of my invention.

It will be understood, however, that this invention may be otherwise embodied within the scope of the following claims.

I claim:

1. A rock bit comprising an elongated generally cylindrical steel body, having at one end an internally threaded opening adapted to receive a drill stem, a plurality of radially extending wings at the other end of said body, a slot in each wing extending from a point adjacent the axis of the body to the end of the wing, a cemented carbide tip in each such slot extending over the length thereof and spaced from the sides of said slot, a metal shim in said slot between each side of said slot and the carbide insert and spaced from each and a braze alloy layer on each side of said shim, said braze alloy layers being fused to opposite sides of the shim and to the carbide insert and the sidewall of the slot.

2. A rock bit as claimed in claim 1 wherein the shim is nickel.

3. A rock bit as claimed in claim 1 wherein the shim is copper.

4. A rock bit as claimed in claim 1 wherein the braze alloy consists essentially of about 54% silver, about 17% copper, about 15% zinc, about 9% cadmium and about 5% nickel.

5. The method of making a rock bit which comprises the steps of
    (a) forming a steel body having radially extending wings at one end, said wings having slots extending from a point adjacent the axis of the body to the end of the wing,
    (b) inserting a cemented carbide insert in each such slot, said insert extending the length of the slot and spaced from the sidewalls thereof,
    (c) placing a shim of metal into the slot between the sidewalls of the insert and the sidewalls of the slot together with a layer of braze metal on each side of said shim,
    (d) heating said bit to a temperature above the melting point of said braze metal and below the fusion point of the metal shim, and
    (e) cooling said bit to solidify the braze metal whereby said insert is attached within the slot.

6. A method as claimed in claim 5 wherein the metal shim is precoated with a layer of braze alloy.

References Cited by the Examiner
UNITED STATES PATENTS

| | | | |
|---|---|---|---|
| 2,673,716 | 3/1954 | Avery | 175—410 |
| 2,794,623 | 6/1957 | Stokes | 175—410 X |
| 2,973,047 | 2/1961 | Edgar | 175—410 |
| 2,976,944 | 3/1961 | Bassinger | 174—410 |
| 3,190,380 | 6/1965 | Anderson | 174—410 |
| 3,191,700 | 6/1965 | McKenna | 175—410 |

JACOB L. NACKENOFF, *Primary Examiner.*

CHARLES E. O'CONNELL, *Examiner.*

N. C. BYERS, *Assistant Examiner.*